United States Patent [19]

Ketring

[11] Patent Number: 5,249,221
[45] Date of Patent: Sep. 28, 1993

[54] TELEPHONE ANSWERING SYSTEM WITH CALL TRANSFER

[75] Inventor: Thomas D. Ketring, Cary, N.C.

[73] Assignee: The Partner, Inc., Raleigh, N.C.

[21] Appl. No.: 825,057

[22] Filed: Jan. 24, 1992

[51] Int. Cl.[5] ............... H04M 3/50; H04M 3/54; H04M 3/58; H04Q 3/64

[52] U.S. Cl. .................. 379/214; 379/127; 379/212; 379/211; 379/265; 379/309

[58] Field of Search ............... 379/210-214, 379/265, 266, 309, 88, 127, 245, 246

[56] References Cited

U.S. PATENT DOCUMENTS

| | | | |
|---|---|---|---|
| 3,987,252 | 10/1976 | Vicari | 379/214 |
| 4,256,928 | 3/1981 | Lesea et al. | 379/211 X |
| 4,956,861 | 9/1990 | Kondo | 379/211 X |
| 4,975,945 | 12/1990 | Carbullido | 379/214 X |
| 5,046,088 | 9/1991 | Margulies | 379/265 |

Primary Examiner—James L. Dwyer
Assistant Examiner—Harry S. Hong
Attorney, Agent, or Firm—John G. Mills & Associates

[57] ABSTRACT

A telephone answering service system in which calls to a telephone which can not be answered are forwarded to a unique number identifying a line in a first telephone company (TELCO) service and immediately forwarded by the first TELCO service to a second TELCO service which uniformly distributes received calls over a group of lines connected to the answering service and provides called number ID and line identification over a separate data line to the answering service. The answering service has a number of operator stations where the status of the group of lines is displayed and processing data relative to the called party is available to answer and forward received calls to another number.

14 Claims, 9 Drawing Sheets

TELEPHONE ANSWERING SYSTEM WITH CALL TRANSFER

FIELD OF INVENTION

This invention relates to telephone answering systems in general and more particularly to telephone answering systems in which an answered call can be transferred to another telephone connected to the switched network without the use of additional telephone lines and the incoming line can be released as soon as the transfer takes place.

BACKGROUND OF INVENTION

Telephonic communication plays an extremely important role in today's business environment and the prompt and courteous handling of incoming telephone calls is of paramount importance to those engaged in commercial business activity. When an incoming business call is unanswered because the line is busy or not manned a business opportunity is lost.

There are a number of solutions to this problem. The most effective, from a result point of view only, is to provide a collocated alternative path for the call to a secretary when a principal is either not available or is busy on another call. Unfortunately this solution is not always practical when costs and benefits are taken into consideration.

The remote shared telephone answering industry grew out of a need for a cost effective representative to accept incoming telephone calls when the called party was either not available or engaged in some other activity away from the office or on another call.

The answering machine and more recently centralized voice mail with their prerecorded greetings are very cost effective solutions to the unattended or unanswered phone, however, they are by far the least effective solution since many callers refuse to talk to a machine and hang up.

Since the remote shared telephone answering service uses a person to answer the call it provides a cost effective alternative to a dedicated secretary and has grown as a result. In response to this growth the service provider telephone industry has made available cost effective services specifically addressing the perceived needs of the answering services. Direct Inward Dialing (DID) is by far the service of choice of the telephone answering industry since it is a least cost solution for providing an answering service only.

Incoming calls are diverted to an answering service for many different reasons. In many instances the called party may be available at another phone, away from the office for a brief time only, engaged in another telephone conversation, failed to answer the call in a timely manner, or just forgot to cancel call-forwarding. In many of these situations it is often desirable (under client instructions) to forward the call to an alternative number where the caller can either reach the called party or some other informed party designated by the client.

Due to inherent service and equipment limitations call transfer is not a viable option for a telephone answering service. Therefore, calls that reach the service are dead ended since there is very little that an operator can do for the calling party other than not the call and pass that information on to the client, usually at some much later time. This often results in telephone tag.

The use of call transfer coupled with the ability to easily locate a client or designee would allow an answering service to more closely approximate the role of a dedicated receptionist for their clients. However, with conventional services and equipment specifically designed for the available service this can not be accomplished at a reasonable cost.

The Direct Inward Dialing (DID) service provided by the telephone industry is particularly suitable for use by a telephone answering service since it provides caller ID, however, it can accommodate incoming calls only. In order to transfer a call received on a DID line it is necessary to provide additional conventional outgoing lines over which the transfer can be effected. In addition, local switching means are required in order to connect the calling party on the DID line to the transferred to party (the client or designee) on the separate conventional line.

In addition to cost this arrangement has many other drawbacks. Probably the most critical drawback is the fact that both the DID line and the outgoing line used in the call transfer are tied up for the entire duration of the conversation between the caller and the client. Since the average business call lasts three minutes a substantial increase in line capacity is required. The cost of this increase must be borne by the client. Since it is substantial it is an impairment to providing the service to a large number of clients.

SUMMARY OF INVENTION

The invention contemplates a method of operating a telephone answering service and a telephone answering system for practicing the method. A call placed to an unanswered phone is forwarded to a unique number associated with a first class of service provided by a service provider which provides the called number. The call including the unique number is again forwarded to a second class of service provided by the service provider. The second class of service connects the caller to one of a plurality of voice lines located at the answering service and via a separate line provides the said unique number and an indicia of the line used for the call. At the answering service the unique number accessed instructions based on the unique number and displays them to an operator for initiation of a call transfer and the voice line is released as soon as the transfer is completed.

The answering service system includes a plurality of stations for selectively answering calls received on a plurality of telephone lines. First means for receiving a unique number identifying the called party and an indicia of the telephone line associated with the unique number and for displaying the status of the plurality of telephone lines at each of said stations. Second means including a plurality of records each associated with a said unique number. Each of said records including instructions for processing the call. Third means at each of said stations for accessing a record associated with one of said calls. Fourth means at each said station responsive to an accessed record for executing transfer instructions contained therein and fifth means for selectively connecting said fourth means to a line associated with a unique number and record.

DESCRIPTION OF THE PREFERRED EMBODIMENT

Figure 1:
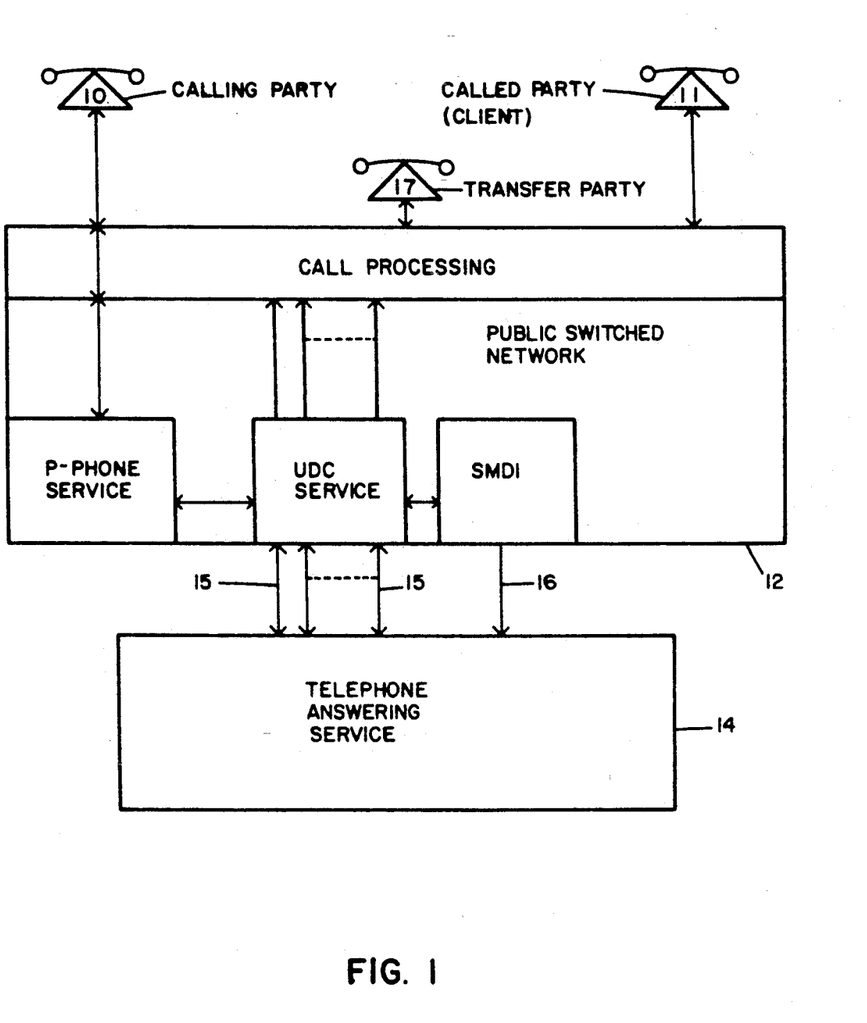
FIG. 1 is a block diagram of a telephone answering service environment.

In FIG. 1 a person at a phone 10 wants to place a call to a phone 11 located at some distant location. Phones 10 and 11 are connected by the public switched network 12. When phone 11 is either unmanned or busy the call placed by the caller at phone 10 is forwarded by the switched network to a telephone answering service 14.

As previously described, this would normally be accomplished by use of the Direct Inward Dialing (DID) service. However, if call transfer under control of the answering service is desired, the use of the DID service is at best undesirable since it requires additional outbound lines to establish the connection and more importantly ties up the incoming DID lines for the duration of the transferred call.

Public telephone networks offer other services which can be used in lieu of the DID service. One of these services Proprietary Phone (P-Phones) is capable of performing the functions required. That is, it can transfer an incoming call without the use of additional lines and the incoming line can be freed after the call has been transferred. At first this would appear to be a viable solution, however, it is not. In the P-Phone service a block of numbers are permanently assigned to each P-Phone line and therefore the capacity of multiple lines can not be used in a flexible manner. For example, if there are four P-Phone lines and four calls are substantially, simultaneously made to numbers in one of the blocks, three calls would receive a busy signal notwithstanding the fact that the other three P-Phone lines may have been idle, an intolerable situation.

Another service, Uniform Call Distribution (UDC) provides call transfer and disconnect, however, it is not able to provide called number ID for externally placed calls and is therefore unsuitable by itself for use in a telephone answering service environment.

While neither of these services is suitable for use by itself in a telephone answering service environment, applicant has discovered that they can be used together to achieve all of the conventional operational objectives of a telephone answering service at a reasonable cost and in addition enable the call transfer function without impacting the availability of the incoming lines.

How these two services interact with each other within the public switched network to provide a new and unexpected result is illustrated schematically in FIG. 1. When the party at telephone 11 is unable to receive calls it instructs the call processing equipment in exchange 12 to forward calls to an assigned P-Phone number resident on one of the P-Phone lines. This line is permanently forwarded to the UCD service which places the call on one of the UCD trunk lines 15 connected to the telephone answering service 14. In addition it provides the assigned P-Phone number and the specific UCD line on which the call is placed to the telephone answering service via the Simplified Message Desk Interface (SMDI). The P-Phone number and the specific UCD line number are supplied to the telephone answering service over a digital data line 16. As soon as the P-Phone line is forwarded to the UCD service the P-Phone line is free to receive another call.

When a call received at the answering service is to be transferred to, for example, to telephone 17, the telephone answering service flashes the UCD line on which the call is present and issues dial digits or tones identifying the telephone 17. When the phone 17 is answered the telephone answering service operator announces the call and hangs up thus releasing the UCD line for another incoming call. How this is accomplished at the telephone answering service will be described below.

Figure 2:
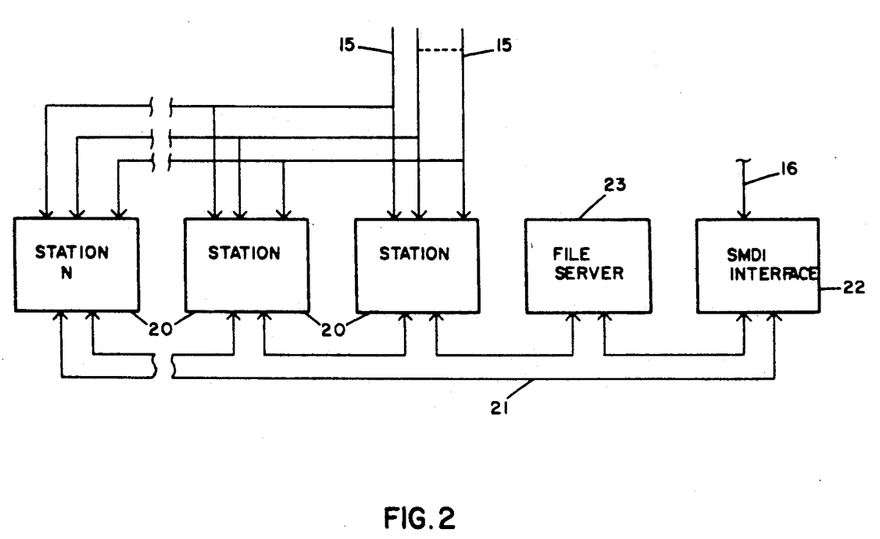
FIG. 2 is a block diagram of the telephone answering service equipment illustrated in FIG. 1.

The block diagram illustrated in FIG. 2 shows the overall organization of the telephone answering service equipment. A plurality of stations (l-n) 20 are connected to the UCD lines 15 and to a Local Area Network (LAN) 21. The details of these stations will be described below. An SMDI interface 22 is connected to data line 16 and to the LAN 21. SMDI interface 22 is an appropriately programmed microprocessor based personal computer such as an IBM PC XT provided with commercially available adapters for connection to the data line 16 and the LAN 21. A file server 23 contains files which will be described below, is connected to the LAN 21. The file server can also be constructed from a properly programmed microprocessor based personal computer such as the IBM PC AT in order to provide adequate performance.

File server 23 stores five files specific to the operation of the telephone answering service. A first file, LOOKUP.DAT, includes a record for each P-Phone number. The record includes the name of the client assigned to that number and an index or offset number for locating client specific data in a second file, FOLKS. Each record in the FOLKS file includes the assigned clients name, special instructions (e.g., greeting, exceptions, etc.) and dial digits and control codes for transferring incoming calls. The file name and the index or offset are unique to a specific client record in the file.

The third file, LINKUP.DAT, includes a record for each of the UCD lines l-n. Each record indicates the status of the UCD line assigned to the record. More specifically, the record includes the name of the called client, the index number in the FOLKS file where the called client record is stored and a flag bit indicating that the line is active or unanswered when the bit is on. After a call is answered by an operator the flag bit is turned off and the line status is indicated as being active.

A fourth file ALT.DAT is similar to the LOOKUP.DAT file, however, it includes non P-Phone numbers which are sometimes substituted by the telephone network when calling party ID is available. This file is used in the same way as the LOOKUP.DAT file when this type of substitution takes place and the number is available. The fifth file, j.MES is a group of records arranged by client name and includes in sequence messages entered by the operators for clients who request them or can not be reached at another number.

The file server and communication programs as well as the communication adapters are commercially available from Novell under the Trademarks Netware and Arcnet, respectively.

The SMDI interface monitors the SMDI line from the local exchange and when a message is received (the message includes the called P-Phone number and the UCD line number on which the call resides), the SMDI interface requests the record in the LOOKUP.DAT file corresponding to the P-Phone number from the file server 23. It then retrieves the LINKUP.DAT file from the file server. It updates the UCD line number record in this file with the information (called client's name and FOLKS file index number) previously accessed and turns the flag bit on. The updated LINKUP.DAT file is then sent to the file server and overwrites the old copy of this file.

The stations 20 periodically access the LINKUP.DAT file and display it. If the flag bit for a UCD line is turned on, the information associated with that record is highlighted on the display to indicate that the line must be answered. An answering service operator using the index number displayed retrieves a copy of the called client record from the file server and (based on the instructions contained in the record) answers the call.

If the call is to be transferred, the operator issues a command and the station program flashes the line and sends the dial digits stored in the client record to the line. If more than one set of dial digits are present in the client record the operator must indicate which are to be used. This feature is particularly useful in those situations where a number of individuals share a common number and calls to different individuals are to be forwarded to different numbers. When the transferred to number answers, the operator announces the call and goes off hook thus freeing the UCD line for another call.

Figure 3:
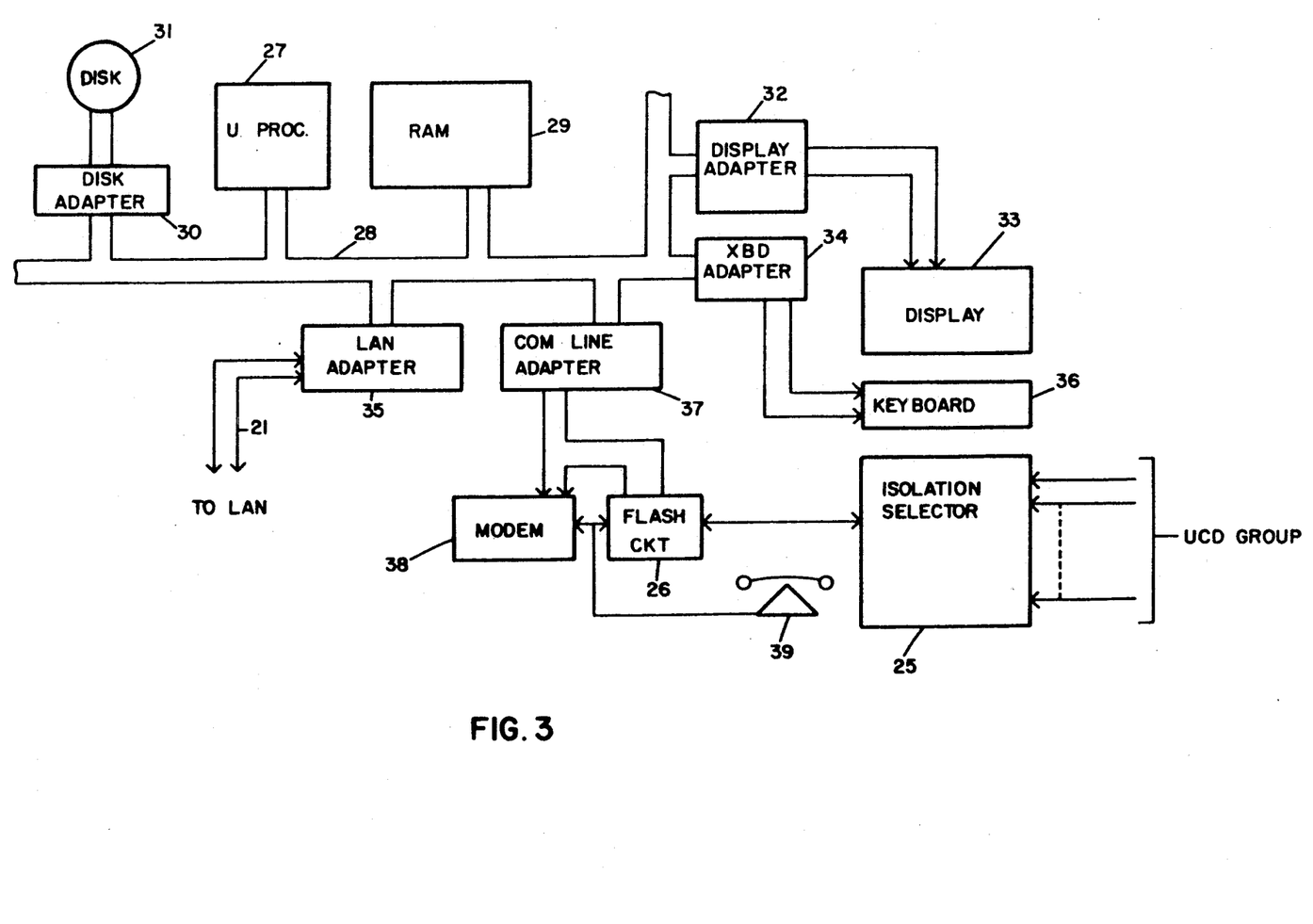
FIG. 3 is a detailed block diagram of a single station illustrated in FIG. 3.

All of the elements illustrated in block form in FIG. 3 except the isolation selector 25 and flash circuit 26 are commercially available from a number of different manufacturers and are typically found in networks of communicating personal computers.

A microprocessor 27 is interconnected by an input/output (I/O) bus 28 to a random access memory (RAM) 29, and by the bus 28 to a number of adapters which drive a number of input and output devices. A disk adapter 30 drives the disk 31. Display adapter 32 drives the display 33. The keyboard adapter 34 and the LAN adapter 35 drive the keyboard 36 and the LAN 21, respectively. A communication adaptor 37 drives both a modem 38 and the flash circuit 26.

Figure 4:
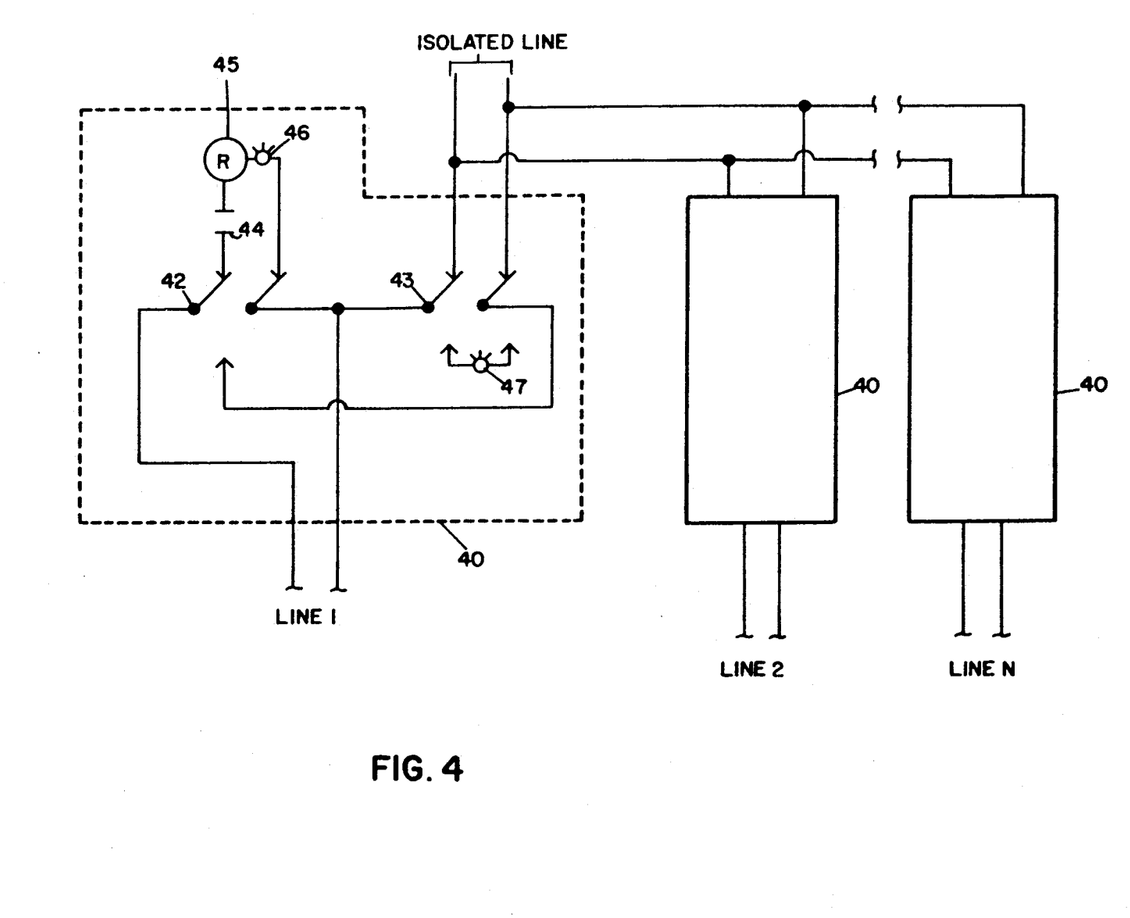
FIG. 4 is a schematic diagram of the isolation selector illustrated in FIG. 3.

The isolation and selector circuit is shown in detail in FIG. 4. It includes n identical switching units 40 each connected to one of the n UCD lines. Each unit 40 includes two double pole double throw switches 42 and 43. Switch 42 performs the hook switch function. It is illustrated in the on hook position. In this position a series circuit including a capacitor 44, a ringer 45 and an LED 46 are connected across UCD line 1. Capacitor 44 prevents dc from circulating in the line, however, the ac ring current has a complete path and will cause an audible signal to emanate from the ringer 45 and the LED 46 to be illuminated.

When the hook switch 42 is moved to the alternate position, the ring circuit is disconnected from the line and the line is connected to the poles of switch 43. In the illustrated position of switch 43 the line is connected to a telephone 39 (see FIG. 3) which has had its hook switch disabled (alternatively a conventional head set without a hook switch could be used). In its alternate position switch 43 acts as a hold switch. An LED 47 indicates the hold state of switch 43. When switch 42 is off hook and switch 43 is in the position illustrated in FIG. 4, the modem 38 and the flash circuit 26 are both connected to the UCD line selected by the answering service operator and under control of processor 27 and its program can flash the line and issue dial digits, either in the form of tones or pulses, to effect the transfer of a call on the selected UCD line.

Figure 5:
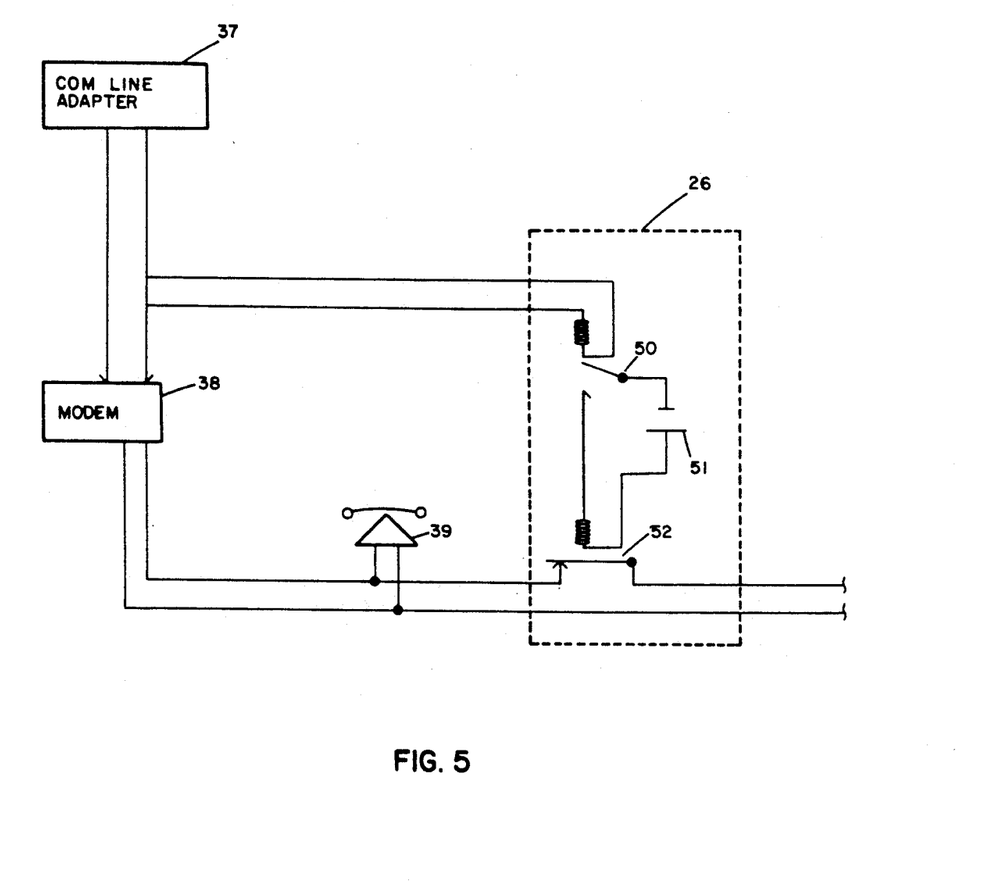
FIG. 5 is a schematic diagram of the flash circuit illustrated in FIG. 3.

FIG. 5 illustrates the details of the flash circuit 26. A normally open read relay 50 is connected to the communication adapter 37 and is closed when energized. When relay 50 closes current from dc supply 51 energizes a normally closed relay 52 which opens and breaks the dc path in the line. When current to read relay 50 is terminated it opens and removes current from relay 52 which then closes. Two relays are used here since the current available from the adapter 37 is insufficient to operate normally closed relay 52.

Figure 6:
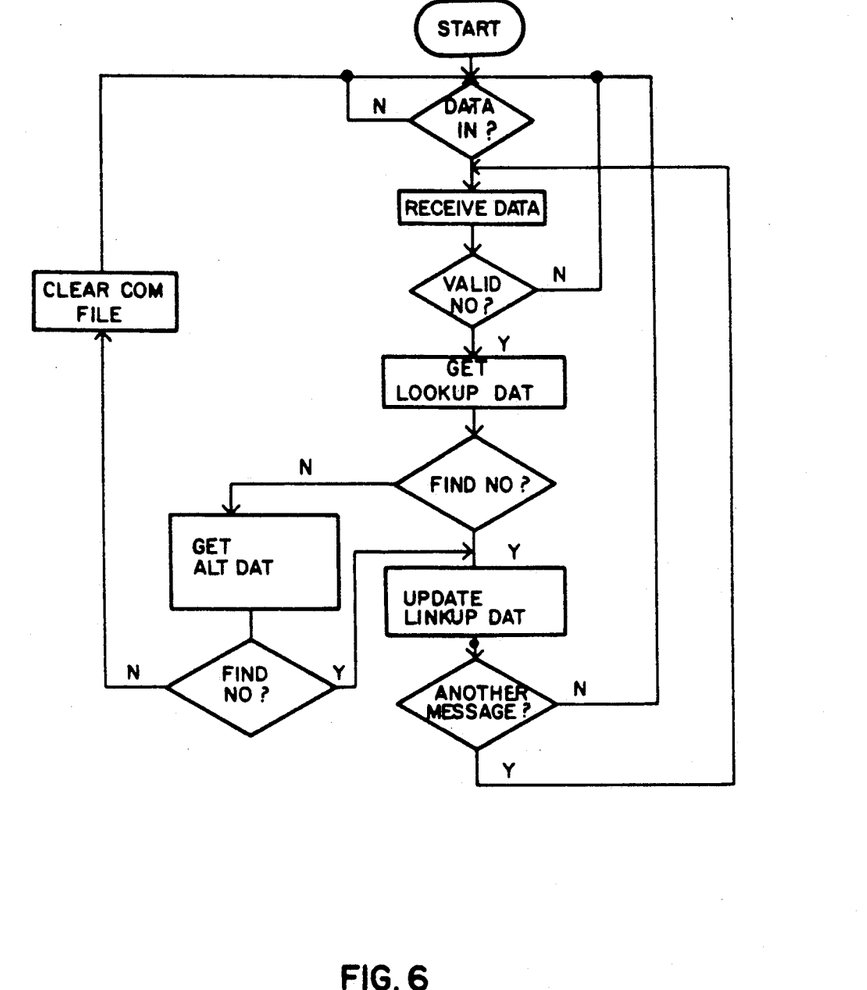
FIGS. 6-9 are flow charts illustrating the functions described in the specification.

The flow chart in FIG. 6 illustrates the function of the SMDI interface 22. The interface loops looking for a data message on the line 16. After the message is received it is checked to see if it has a valid number (i.e., the correct number of digits). If not it goes back to start and loops. If the number is valid it goes to the file server 23 with a request for the record in the LOOKUP.DAT file corresponding to the received number. If the number is found, it updates the LINKUP.DAT file in the file server 23 and checks to see if another message has been received in the meantime. If yes, it goes back to receive data and repeats the above steps for the new number and line. If no, it goes back to start.

When the number is not found it tries to get the number from the ALT.DAT file. If the number is in the ALT.DAT file, the LINKUP.DAT file is updated and the process continues as previously described. If the received number is not in the ALT.DAT file, the received file which includes the number is cleared and the process returns to start.

Figure 7:
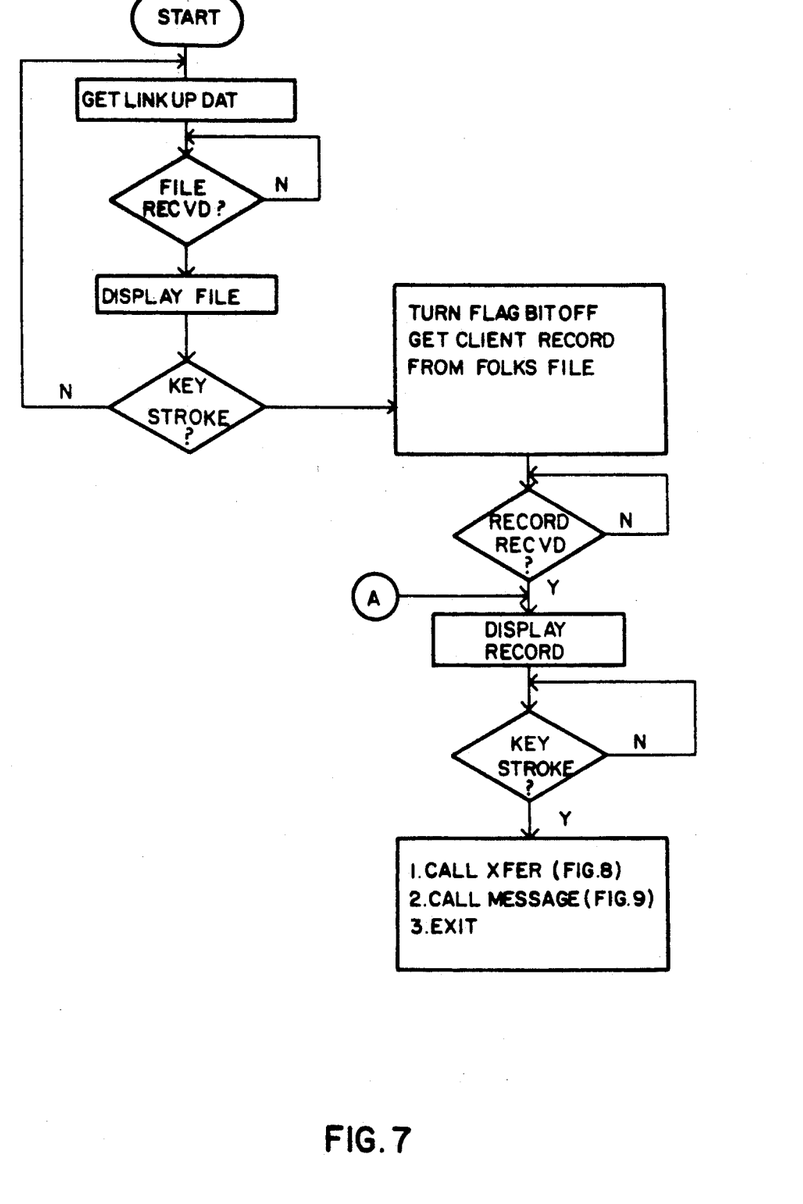
Figure 8:
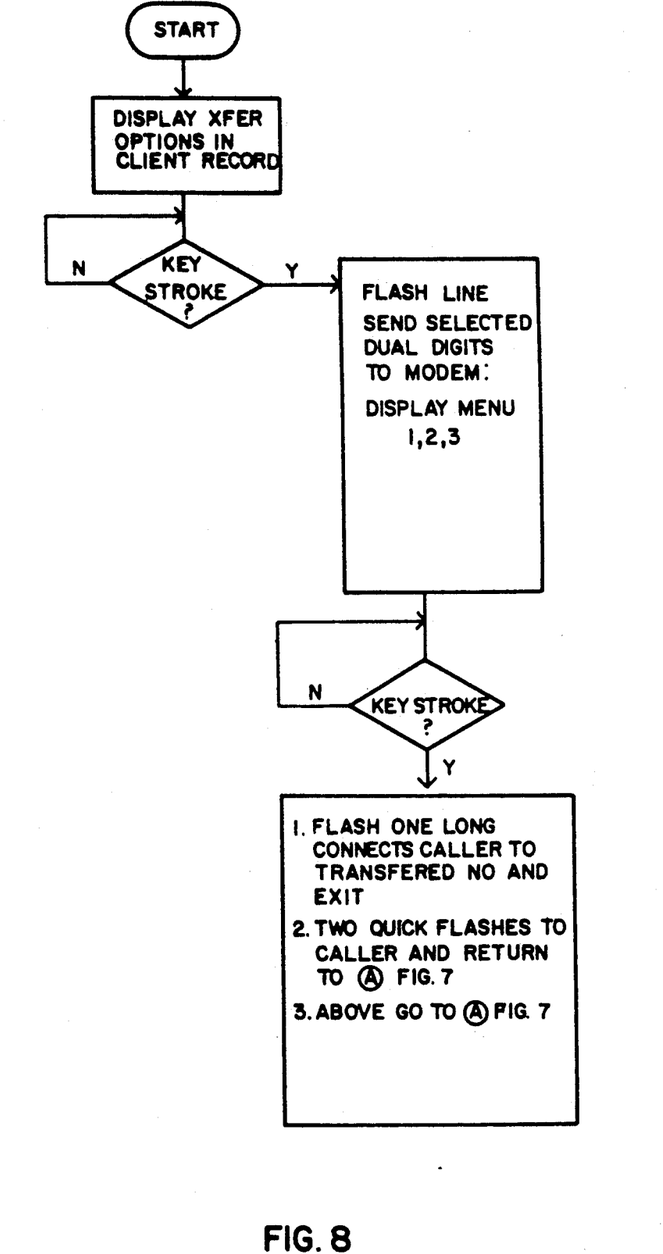
Figure 9:
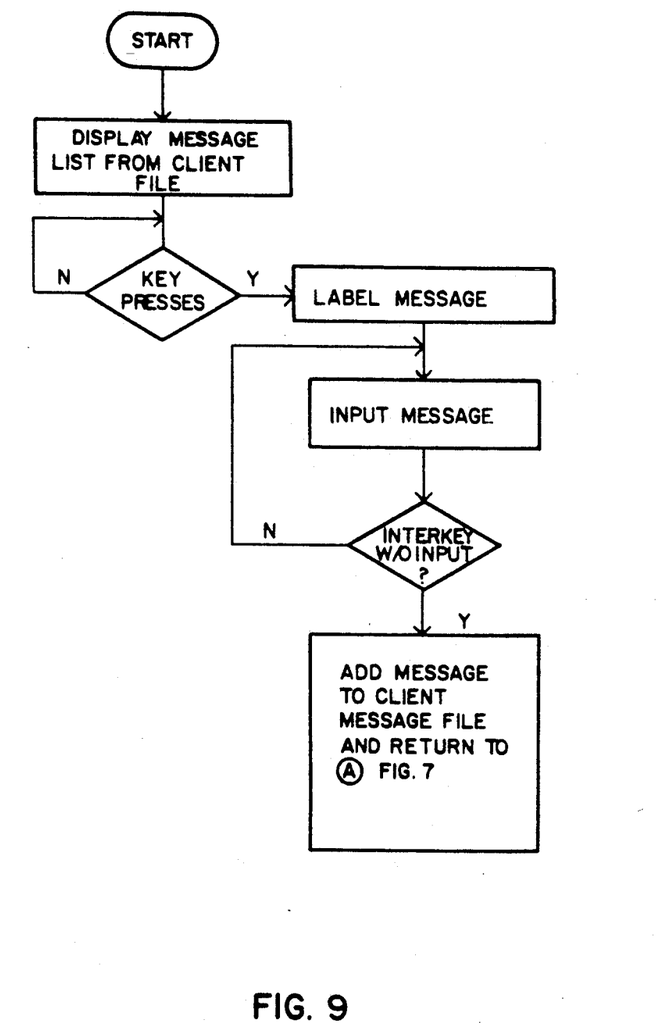

The flow diagram illustrated in FIG. 7 sets forth the operation at each of the operator stations 20 and the flow diagrams illustrated in FIGS. 8 and 9 show subroutines which can be called in the execution of the flow diagram in FIG. 7.

In FIG. 7 a copy of the LINKUP.DAT file is requested from the file server 23. When the file is received it is displayed on display 33. After display, the program looks for a key stroke. If a key stroke is not received, it again requests another copy of the LINKUP.DAT file. This assures that the latest updated version is displayed. When a keystroke is received, the program sends a request to the file server 23 for the client record corresponding to the index number included in the record identified by the received keystroke. At this time the flag bit in the record selected by the keystroke is reset to indicate that the line has been answered and the updated file is sent to the file server 23.

When the requested client record is received from the file server 23, pertinent call processing information (such as client name, greeting, options, etc.) are displayed at the requesting station and the program loops awaiting a keystroke identifying an exit (used when the operator can complete the call without further processing or the call fails for some other reason), a transfer (FIG. 8, used when the displayed client record and the calling party response indicates the need for a transfer to another telephone number included in the client record) or a message routine (FIG. 9, used when a transfer is not indicated in the displayed client record or is inappropriate in view of the calling party response).

When a transfer is selected by the key entry, the program branches to the subroutine illustrated in FIG. 8. At this time transfer options included in the client record are displayed. For example, a client may have several sales persons who can be reached at different numbers when away from their office phone. In this situation, the call transfer display would list the different sales persons (and while not necessary the transfer to telephone numbers) each of which can be selected by a different key stroke.

The program loops awaiting keystroke selection by the operator. When the keystroke is received, the telephone line is flashed via adapter 37 and flash circuit 26. After this the dial digits associated with the options selected by the keystroke are sent to the telephone line via the adapter 37 and the modem 38, and a menu is displayed whereupon the program looks for a selection keystroke. If the operator wants to connect the caller to the transferred to number, 1 is entered and the program generates a long line flash which connects the caller to the transferred to number and exits. If the operator (based on the connection to the transferred to number e.g., no or refused call) desires to be reconnected to the caller, a 2 is entered and the program causes two quick flashes of the line and returns to A in FIG. 7. If the operator wants to abort, a 3 is entered and the program returns to A in FIG. 7.

If a message has been selected in FIG. 7 the program branches to the message subroutine illustrated in FIG. 9. In this subroutine the program displays a list of recipients from the client file. This covers the situation previously described in which a client may have a number of different persons each of which will be receiving messages. The operator selects the appropriate recipient by key entry. In response to the keystroke the program attaches the selected label to a message block which is displayed. The operator enters the message via the keyboard. When the message has been entered a double enter key causes the message to be stored in a client message file i.MES in the file server 23 and the program exits automatically. While a single embodiment of the invention has been described in detail it will be obvious to those skilled in the art that changes and modifications can be made without departing from the spirit and scope of the described invention.

What is claimed is:

1. A telephone answering system for receiving calls forwarded from the answering system's client phones by the switched network over a group of lines and data including a unique number identifying the called client and data identifying a line in the group of lines on which a forwarded call resides comprising:

storage means for storing at least first and second files, said first file including a plurality of client records each corresponding to one of the unique client identifying numbers and including a name identifying the client and call processing information, said second file including a plurality of line records, one for each line in the said group of lines, each said line record including the status of the line, and an indicia for accessing the client record in the first file corresponding to the said unique number identifying data identifying the client provided by the switched network;

processing means connected to the said storage means and responsive to the said data supplied by the switched network identifying the unique number and the line on which the call resides for updating the said second file in the said storage means to reflect the current status of each line in accordance with the received data; and at least one operator station connected to said lines and said storage means and including operator controlled means for fetching and displaying the contents of the said second file, for selectively fetching and displaying a client record in the said first file in accordance with the displayed line status and answering the call as instructed in the displayed client record.

2. A telephone answering system as set forth in claim 1 in which said at least one operator station also includes:

a line flashing circuit, a signal generator for generating signals representing dial digits;

selection means for selecting the line corresponding to the displayed client record;

connecting means for connecting said flashing circuit, said signal generator and the selection means in parallel; and, operator initiated means for sending a control signal to said flashing circuit to flash the selected line and to send dial digits stored in the client record to the signal generator whereby the call is transferred by the switched network to the telephone identified by the dial digits stored in the client record.

3. A telephone answering system as set forth in claim 2 in which said selection means comprises:

a plurality of switching means one for each line in the said group of lines for selectively connecting the line to the said connecting means.

4. A telephone answering system for receiving calls forwarded from the answering system's client phones by the switched network over a group of lines and data including a unique number identifying the called client and data identifying the line in the group of lines on which a forwarded call resides comprising:

storage means for storing first, second and third files, said first file having a plurality of first records each corresponding to a different one of the unique numbers identifying the clients and including therein call processing information for the identified client, said second file having a plurality of second records one for each of said unique numbers and including the associated client name and an indicia for accessing the corresponding first record in the first file and said third file having a plurality of third records one for each of the lines in the group of lines, each said third record including the status of the line and an indicia for accessing a first record in the first file;

processing means connected to the said storage means and responsive to the data from the switched network for updating a third record, identified by the received data, the said third file to reflect the current status of each line; and at least one operator station connected to said lines and said storage means and including operator controlled means for displaying the contents of the said third file, selectively accessing and displaying a first record in the said first file and answering the call as instructed in the display first record from the first file.

5. A telephone answering system as set forth in claim 4 in which said at least one operator station also includes:

a line flashing circuit, a signal generator for generating signals representing dial digits;

selection means for selecting the line corresponding to the displayed client record;

connecting means for connecting said flashing circuit, said signal generator and the selection means in parallel; and, operator initiated means for sending a control signal to said flashing circuit to flash the selected line and to send dial digits stored in the client record to the signal generator whereby the call is transferred by the switched network to the telephone identified by the dial digits stored in the displayed first record.

6. A telephone answering system as set forth in claim 5 in which said selection means comprises:

a plurality of switching means one for each line in the said group of lines for selectively connecting the line to the said connecting means.

7. A method of operating a telephone answering service in which calls to an answering service client telephone from callers via a public telephone network are forwarded to the answering service when the client is unable to answer a call comprising the steps:

forwarding calls placed to an unattended client telephone to a preassigned client telephone number which is a unique one of a plurality of preassigned telephone numbers assigned to a line of a first telephone service provided by the said public telephone network;

immediately forwarding calls received on said line of said first service to a second service provided by the said public telephone network which uniformly distributes all received calls over a group of lines connected to the telephone answering service and provides signals to the telephone answering service identifying the said preassigned number and the one line of said group of lines over which the cell is routed;

receiving said signals at said telephone answering service, accessing stored call processing information associated with said preassigned client number and displaying said call processing information at an operator station; and, flashing the said one line over which the call is routed and thereafter transmitting dial digits identifying another telephone connected to the said public telephone network when the call processing information indicated that the caller is to be transferred and thereafter placing the said one line over which the call is routed on hook whereby the one line is available for receiving additional calls.

8. The method as set forth in claim 7 in which the telephone answering service is provided with a plurality of lines in the first telephone service and each of the clients is provided with a unique telephone number on one of the lines.

9. A method as set forth in claim 7 in which the said signals from said second service are sent to the answering service over a dedicated data line distinct from the group of lines used by the said second service for connecting forwarded calls to the answering service.

10. A method as set forth in claim 7 in which the dial digits issued are included in the stored call processing information and are issued on command.

11. A method as set forth in claim 10 in which the said stored call processing information includes a plurality of different dial digits and the answering service operator selects one in response to information received from the caller.

12. A telephone answering service system for receiving calls forwarded from the answering service's client phones by the switched network over a group of lines each having a different line number and data including a unique number identifying the called client and data identifying the line number in the group of lines on which a forwarded call resides comprising:

storage means for storing call processing information;

at least one operator station;

control means responsive to the unique number identifying the called client, the data identifying the line in the group of lines on which the call resides and the stored call processing information for displaying the status of each line in the group of lines at the said at least one operator station, said status including a line activity indicator and an indicia identifying the client corresponding to the unique number;

first operator actuated means for selecting one of said lines indicated as active for answering;

second operator actuated means for accessing the call processing information from said first means corresponding to the client identification indicia included in the selected line status display whereby the call can be processed in accordance with the accessed call processing information; and, third operator actuated means for flashing the line on which the call resides and thereafter transmitting dial signals over the said line which signals identifying another telephone connected to the switched network to which the caller can be connected.

13. A telephone answering system as set forth in claim 12 in which said first operator actuated means for selecting one of said lines indicated as active for answering includes:

a plurality of switching means each connected to a different one of the lines in the said group of lines for selectively connecting its line to said control means when selected and for isolating its line from the said control means until selected.

14. A telephone answering system as set forth in claim 12 in which said storage means includes a file server having:

a first file with a plurality of first records, each corresponding to one client, arranged by the unique client number and each including call processing instructions and at least one set of dial digits identifying a telephone to which calls placed to that client number are selectively forwarded to;

a second file with a plurality of second records one corresponding to each said unique client number and arranged in accordance with said unique number, each said second record including the corresponding client name and an indicia for accessing the corresponding client first record in the said first file; and, a third file with a plurality of third records each one corresponding to one of the lines in the said group of lines and arranged in accordance with the line numbers.

* * * * *